(12) United States Patent
O'Mullan et al.

(10) Patent No.: US 9,009,457 B2
(45) Date of Patent: Apr. 14, 2015

(54) INTEGRATED CIRCUIT BOOT CODE AND FUSE STORAGE IMPLEMENTED ON INTERPOSER-MOUNTED NON-VOLATILE MEMORY

(75) Inventors: Sean M. O'Mullan, Austin, TX (US); Jason Mulig, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 335 days.

(21) Appl. No.: 13/560,467

(22) Filed: Jul. 27, 2012

(65) Prior Publication Data
US 2014/0032888 A1    Jan. 30, 2014

(51) Int. Cl.
*G06F 9/24* (2006.01)
*G06F 9/44* (2006.01)

(52) U.S. Cl.
CPC .................................. *G06F 9/4403* (2013.01)

(58) Field of Classification Search
CPC .................................................... G06F 9/4403
USPC ............................................................ 713/2
See application file for complete search history.

(56) References Cited

U.S. PATENT DOCUMENTS

| | | | |
|---|---|---|---|
| 5,386,552 A | 1/1995 | Garney | |
| 7,296,143 B2 | 11/2007 | Gaskins et al. | |
| 7,558,958 B2 * | 7/2009 | Lieberman et al. | 713/176 |
| 7,809,466 B2 | 10/2010 | Kobayashi | |
| 7,886,141 B2 * | 2/2011 | Jan et al. | 713/2 |
| 8,661,235 B2 * | 2/2014 | Spottswood et al. | 713/2 |

* cited by examiner

*Primary Examiner* — Albert Wang
(74) *Attorney, Agent, or Firm* — Meyertons Hood Kivlin Kowert & Goetzel; Erik A. Heter (57) ABSTRACT

A method and apparatus for replacing a boot ROM and programmable fuses using a non-volatile memory and an interposer is disclosed. In one embodiment, an apparatus includes an integrated circuit (IC) implementing one or more processor cores. The apparatus further includes a non-volatile memory configured to store configuration settings and boot code for the IC. The apparatus further includes an interposer. Both of the IC and the non-volatile memory are mounted on a substrate of the interposer. The IC and the non-volatile memory are electrically coupled to one another through the substrate. During a system boot, the IC may access boot code and configuration settings from the non-volatile memory via electrical connections in the substrate that are externally inaccessible.

21 Claims, 5 Drawing Sheets

INTEGRATED CIRCUIT BOOT CODE AND FUSE STORAGE IMPLEMENTED ON INTERPOSER-MOUNTED NON-VOLATILE MEMORY

BACKGROUND

1. Technical Field

This disclosure is directed to electronic systems, and more particularly, systems for storing boot code and configuration settings for computer processors.

2. Description of the Related Art

During the start up of a computer system, a processor executes a group of instructions commonly known as boot code. The boot code contains the initial instructions executed by the processor upon being powered up. These instructions may be used to perform various tasks such as performing self-tests, locating and initiating communications with peripheral devices, and locating and loading an operating system. This procedure is commonly referred to as a boot up. Additionally, a processor may access various configuration settings during boot up. Such configuration settings may include operating voltages, operating clock frequencies, information regarding power states, and information regarding portions of the processor that may be enabled or disabled.

Boot code may be implemented on a read-only memory (ROM). Similarly, configuration settings may be accessed by reading a set of programmable fuses also implemented on the processor. The ROM storing the boot code (the 'boot ROM') may be implemented on the same integrated circuit die as the remainder of the processor. Changes to the boot code for future instances of the processor may be accomplished by changing masks used during fabrication of the integrated circuit upon which it is to be implemented. The programmable fuses may also be implemented on the same die using fuses that are typically one-time programmable.

SUMMARY OF EMBODIMENTS

A method and apparatus for replacing a boot ROM and programmable fuses using a non-volatile memory and an interposer is disclosed. In some embodiments, an apparatus includes an integrated circuit (IC) including one or more processor cores. The apparatus further includes a non-volatile memory configured to store configuration settings and boot code for the IC. The apparatus further includes an interposer. Both of the IC and the non-volatile memory are mounted on a substrate of the interposer. The IC and the non-volatile memory are electrically coupled to one another through the substrate.

In some embodiments, a method includes providing power to an integrated circuit package including an interposer, an IC mounted on the interposer, and a non-volatile memory mounted on the interposer and electrically coupled to the IC. The method further includes initializing operation of the IC responsive to providing power, and performing a boot-up procedure, wherein performing the boot-up procedure comprises the IC accessing boot code from the non-volatile memory.

BRIEF DESCRIPTION OF THE DRAWINGS

Other aspects of the disclosure will become apparent upon reading the following detailed description and upon reference to the accompanying drawings which are now briefly described.

While the disclosed embodiments are susceptible to various modifications and alternative forms, the disclosed embodiments are shown by way of example in the drawings and will herein be described in detail. It should be understood, however, that the drawings and description thereto are not intended to limit the disclosed embodiments to the particular form disclosed, but, on the contrary, the disclosed embodiments are to cover all modifications, equivalents, and alternatives falling with the spirit and scope of the disclosed embodiments as defined by the appended claims.

DETAILED DESCRIPTION

Figure 1:
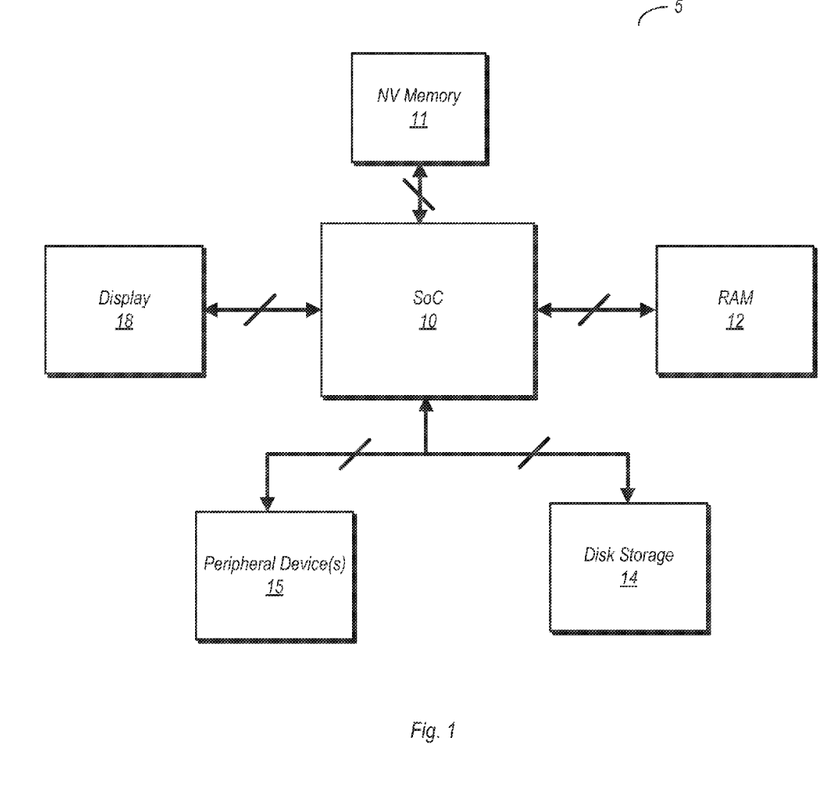
FIG. 1 is a block diagram of a computer system, in accordance with some embodiments.

Turning now to FIG. 1, a block diagram of one embodiment of a computer system is shown. In the embodiment shown, computer system 5 includes a integrated circuit (IC) die 10, a non-volatile memory (NVM) 11, random access memory (RAM) 12, disk storage 14, one or more peripheral devices 15, and display 18. Other configurations of computer system 5 are possible and contemplated, including those that include additional components not shown here, as well as those that include fewer components than shown here.

IC 10 may include a processor (e.g., a central processing unit), a system-on-a-chip (SoC), a microcontroller, an embedded processor, or the like. The IC 10 may include one or more processor cores. IC 10 may include additional agents beyond the processor cores. These agents are not shown here for the sake of simplicity, but are now discussed briefly. For example, IC 10 may include a graphics processing unit (GPU), a memory controller, and/or an input/output (I/O) controller. The GPU may process information that is to be displayed on display 18 (which may be any type of suitable display). The I/O controller may facilitate and control communications between IC 10 and the peripheral device(s) 15 (which may be any type of peripheral device, such as a printer, a game controller, and so on). In addition, the I/O controller may also facilitate and control communications between IC 10 and hard disk storage 14. The memory controller may control read and write accesses to RAM 12.

In some embodiments, NVM 11 stores boot code. In contrast to a processor in which the boot code is implemented in a read-only memory (ROM) on the same integrated circuit die as the processor, IC 10 does not include such a ROM (but may include a small memory for storing prelude boot code, as discussed below). Thus, during a boot up of computer system 5, boot code may be accessed from NVM 11 by IC 10 instead of being accessed from an onboard ROM of IC 10.

In some embodiments, NVM 11 stores configuration settings that would otherwise be stored using programmable fuses. Many processors utilize programmable fuses to store various types of configuration information. Such configuration information may include operating voltages, clock frequencies, which of certain types of agents may be enabled or disabled, and so on. The programmable fuses used are one-time programmable fuses, and thus, once programmed, cannot be reprogrammed. In these embodiments, configuration information is stored in NVM 11, thereby obviating the need for programmable fuses implemented on IC 10. Furthermore, since the configuration information is implemented on NVM 11, it is reprogrammable.

In some embodiments NVM 11 stores performance information. The performance information may include possible operating points and conditions under which IC 10 or agents thereof are to be operated at a given operating point. An operating point may include an operating voltage and a clock frequency, but may include additional information as well. In some embodiments, IC 10 may conform to the Advanced Configuration and Power Interface (ACPI) specification, and thus the performance information may be directed to various ACPI P-states and corresponding thresholds. The thresholds may include temperature thresholds, processing workload thresholds, and any other threshold which may be used in deciding which particular P-state/operating point is appropriate for current conditions.

In some embodiments, NVM 11 stores debug information. For example, information regarding a failing processor state occurring in field operation may be written into NVM 11, enabling it to be recreated at a later time in a laboratory environment. This in turn may aid in additional debugging of IC 10 for future revisions thereof.

In some embodiments, NVM 11 includes flash memory. Other embodiments are possible and contemplated wherein NVM 11 includes an erasable-programmable read only memory (EPROM), a non-volatile resistive memory, a phase-change memory, or any other suitable type of non-volatile memory.

Storing information such as boot code and/or configuration settings in NVM 11 may provide flexibility that is not obtainable when boot code is stored in an onboard ROM and configuration settings are stored using programmable fuses. In embodiments where the boot code is implemented in an onboard ROM, changes to the boot code are accomplished by changing the wafer masks used to fabricate the IC 10. Generally speaking, for a given instance of an IC, boot code changes are not possible in a post-silicon environment when the boot code is implemented in an onboard ROM of the IC. In contrast, the utilization of NVM 11 may allow a number of post-silicon changes to the boot code, and do not necessitate changes to wafer masks for future instances of the corresponding IC. Thus, during a developmental stage, experimentation with a number of different boot code configurations is possible, which may thus allow for boot code optimization.

Similarly, implementing configuration information in NVM 11 instead of in programmable fuses may allow for experimentation with a number of different configurations. In embodiments in which a configuration is stored using fuses, experimentation with different configurations was performed only during simulation. However, once programmed into fuses on a particular instance of an IC, the configuration is fixed, with no changes possible. Thus, post-silicon experimentation with different configurations is not possible for an IC in which this information was stored using programmable fuses. Furthermore, errors in programming fuses could potentially lead to an inoperable IC. In contrast, storing configuration information in NVM 11 not only allows experimentation with different configurations in a post-silicon environment, it also allows correction of programming errors.

In some embodiments, IC 10 and NVM 11 are mounted on a substrate of an interposer. For example, IC 10 and NVM 11 may be soldered to the substrate of the interposer. The substrate may include electrical connections enabling the access of the information stored on NVM 11 by IC 10. Embodiments of such an arrangement are discussed in further detail below, beginning with the description of FIG. 2.

Figure 2:
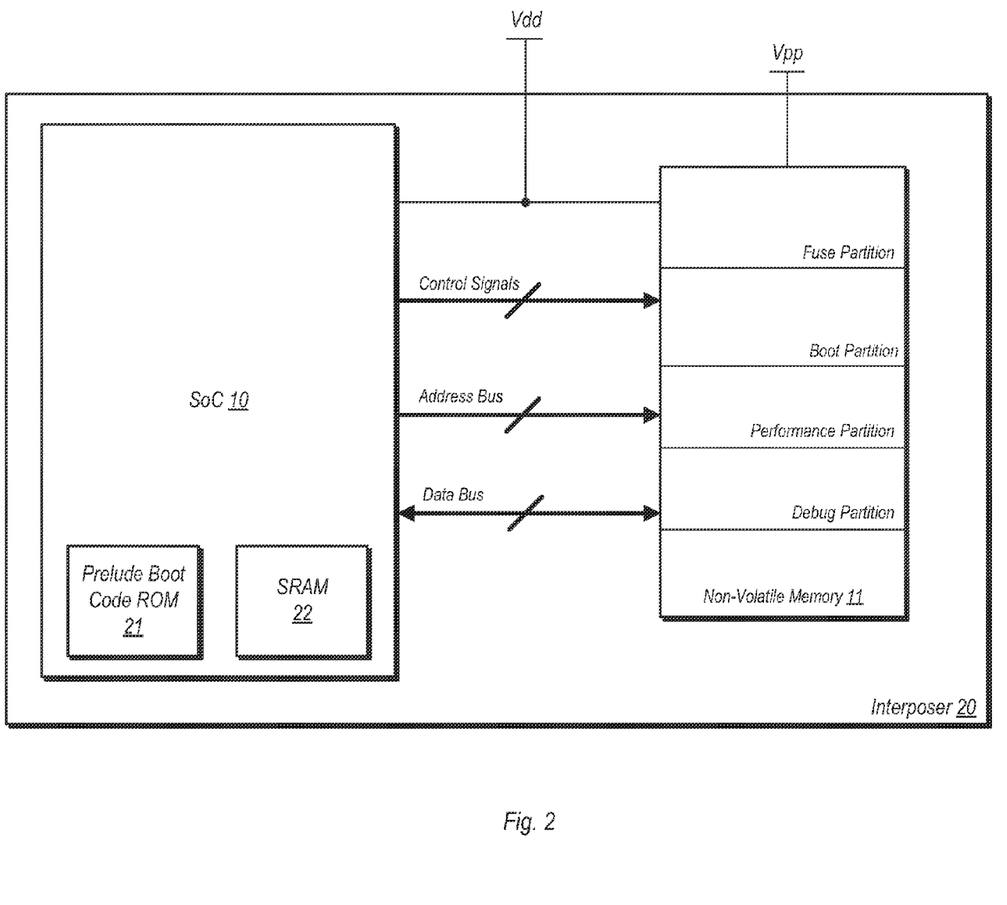
FIG. 2 is a block diagram of an interposer with an integrated circuit (IC) die and a non-volatile memory, in accordance with some embodiments.

FIG. 2 is a block diagram an interposer with an IC and a non-volatile memory, in accordance with some embodiments. As illustrated in FIG. 2, IC 10 and NVM 11 are both mounted on interposer 20. Interposer 20 includes a substrate having electrical connections therein that are used to electrically coupled IC 10 to NVM 11. In some embodiments, interposer 20 is configured to receive a power supply voltage, Vdd, which is distributed through electrical connections in the substrate to IC 10 and NVM 11. In some embodiments, interposer 20 is configured to receive a programming voltage, Vpp, which is distributed through electrical connections in the substrate to NVM 11 and is provided during programming operations. In some embodiments, Vpp is provided by automatic test equipment (ATE) during testing of the assembled interposer 20 (e.g., the interposer 20 including the mounted IC 10 and NVM 11). In some embodiments, Vpp is provided by an end-user system (e.g., a motherboard in computer system 5).

In some embodiments, IC 10 includes a prelude boot code ROM 21, which includes a relatively small number of instructions to start the boot up process. When power is initially applied to IC 10, instructions stored in prelude boot code ROM 21 is provided to one or more execution units in one or more processor cores (not shown), which may execute these instructions to initiate the boot up process. The instructions included in prelude boot code ROM 21 include instructions that cause IC 10 to access the main boot code stored in NVM 11. The instructions comprising the main boot code stored in NVM 11 is then transferred to IC 10 for execution. In some embodiments IC 10 includes a static random access memory (SRAM) 22 that stores the instructions of the boot code obtained from NVM 11. Subsequent to loading into SRAM 22, one or more processor cores of IC 10 may access the boot code instructions from the SRAM for execution. It is however noted that SRAM 22 is optional, and in some embodiments, the one or more processor cores of IC 10 access boot code instructions directly from NVM 11 as needed.

In some embodiments, NVM 11 includes a number of partitions. In some embodiments, the NVM 11 includes a boot partition that includes the boot code instructions. In some embodiments, the NVM 11 includes a fuse partition that stores configuration and identification information (e.g., a serial number for IC 10 or the assembly as a whole) that would otherwise be stored using programmable fuses if NVM 11 were not present. In some embodiments, the fuse partition is lockable subsequent to programming in order to prevent reprogramming and unauthorized changes to the information stored therein. In some embodiments, a performance partition in NVM 11 stores information for various operating points (e.g., operating voltages and clock frequencies, etc.) and conditions under which a particular operating point is chosen. In some embodiments, the information stored in the performance partition is loaded into SRAM 22, and is accessed from SRAM 22 during operation of the IC 10 (e.g., by operating system software). In some embodiments, a debug partition is used to store state information regarding the state of IC 10 (or a processor core thereof) when an error condition or a failure is detected. The state information may be accessed during the performance of failure analysis.

In some embodiments, IC 10 and NVM 11 are coupled to one another by three different buses. A control bus is used by IC 10 to convey control signals to NVM 11. The control signals may include read enable signals, write enable signals (e.g., for writing state information into the debug partition), and any other control signals used in accessing NVM 11. An address bus is used by IC 10 to convey address signals to NVM 11 to indicate an address to be accessed. A data bus is a bi-directional bus used to convey data signals between IC 10 and NVM 11. In some embodiments, each (or a subset) of these buses is implemented using electrical connections that are implemented within the substrate of interposer 20. The electrical interconnections may be implemented such that they are externally inaccessible when IC 10 and NVM 11 are mounted on interposer 20. This may in turn prevent unauthorized access to the information stored in NVM 11.

Figure 3A:
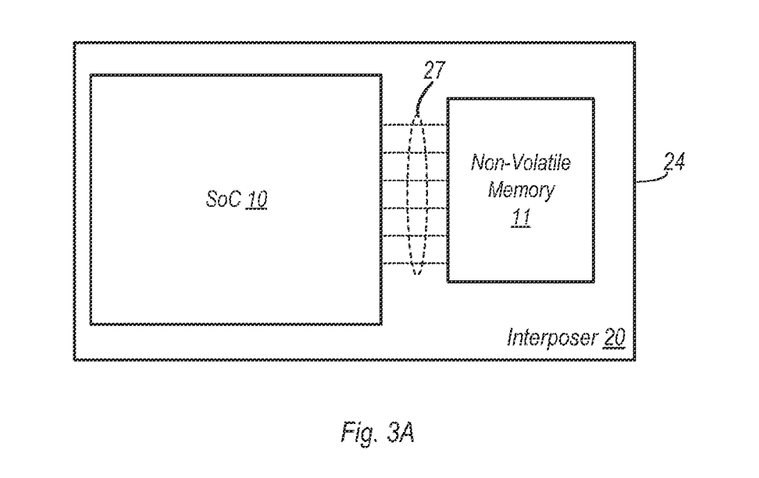
FIGS. 3A and 3B illustrate top and side views, respectively, of a package including an IC and a non-volatile memory mounted on an interposer, in accordance with some embodiments.
Figure 3B:
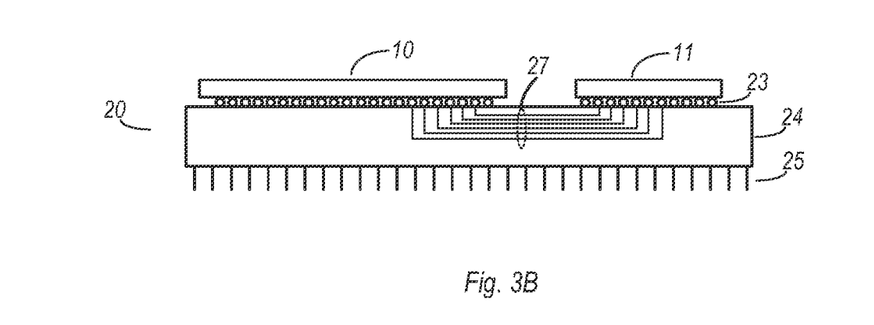

FIGS. 3A and 3B illustrate top and side views, respectively, of a package including an IC and a non-volatile memory mounted on an interposer, in accordance with some embodiments. In FIG. 3A, a top-down view is shown. IC 10 and NVM 11 are both mounted on interposer 20 adjacent to one another. A representative plurality of electrical connections 27 is also shown. As indicated by the dashed lines, electrical connections 27 are implemented within and below the surface of substrate 24 of interposer 20. This may in turn result in these connections being externally inaccessible (e.g., by a probe or other instrumentation) when IC 10 and NVM 11 are mounted upon substrate 24.

FIG. 3B illustrates a side view of the package including IC 10, NVM 11, and interposer 20. As illustrated in FIG. 3B, IC 10 and NVM 11 are mounted upon substrate 24 by solder balls 23. The arrangement of solder balls for each of IC 10 and NVM 11 may be in the form of a grid array, and thus both of these components are mounted to substrate 24 by a ball grid array (BGA). It is noted that other related mounting arrangements are possible and contemplated, including those of a land grid array (LGA) and pin grid array (PGA). With respect to the BGA associated with NVM 11, the solder balls 23 at the periphery of the BGA may be ground connections, power connections, or dummy connections (i.e. no electrical connection). This may prevent the accessing of signals conveyed between IC 10 and NVM 11 by an external probe. Similarly, those solder balls 23 of IC 10 associated with connections to NVM 11 may be within the periphery of the corresponding BGA such that an external probe cannot access those connections from the IC side. Thus, unauthorized access to signals transferred between NVM 11 and IC 10 may be prevented. Furthermore, as noted above, the electrical connections 27 between IC 10 and NVM 11 may be sub-surface connections with respect to substrate 24, further making the connections externally inaccessible.

In some embodiments, interposer 20 include a plurality of connection pins 25. These pins may be suitable for mounting in a PGA of a printed circuit board, thereby enabling connection of the package to a system board. Embodiments in which interposer 20 includes solder balls suitable for BGA mounting, or elastomeric connectors suitable for an LGA mounting, are also possible and contemplated.

Furthermore, although not shown here, additional components may be included in the assemblies shown in FIGS. 3A and 3B. For example, in some embodiments, the assembly may include a lid covering both IC 10 and NVM 11. Embodiments in which one or more heat sinks are included in the assemblies are also possible and contemplated.

Thus, by using interposer 20 to connect IC 10 to NVM 11, unauthorized access to signals transferred therebetween may be prevented. Furthermore, by implementing both IC 10 and NVM 11 on the same substrate, rather than mounting them at different locations on a printed circuit board, issues such as long delay, power issues, and capacitances of circuit board traces may be eliminated. Thus, using the interposer to connect IC 10 to NVM 11, access times may be faster, use less power, and may be more secure.

Figure 4:
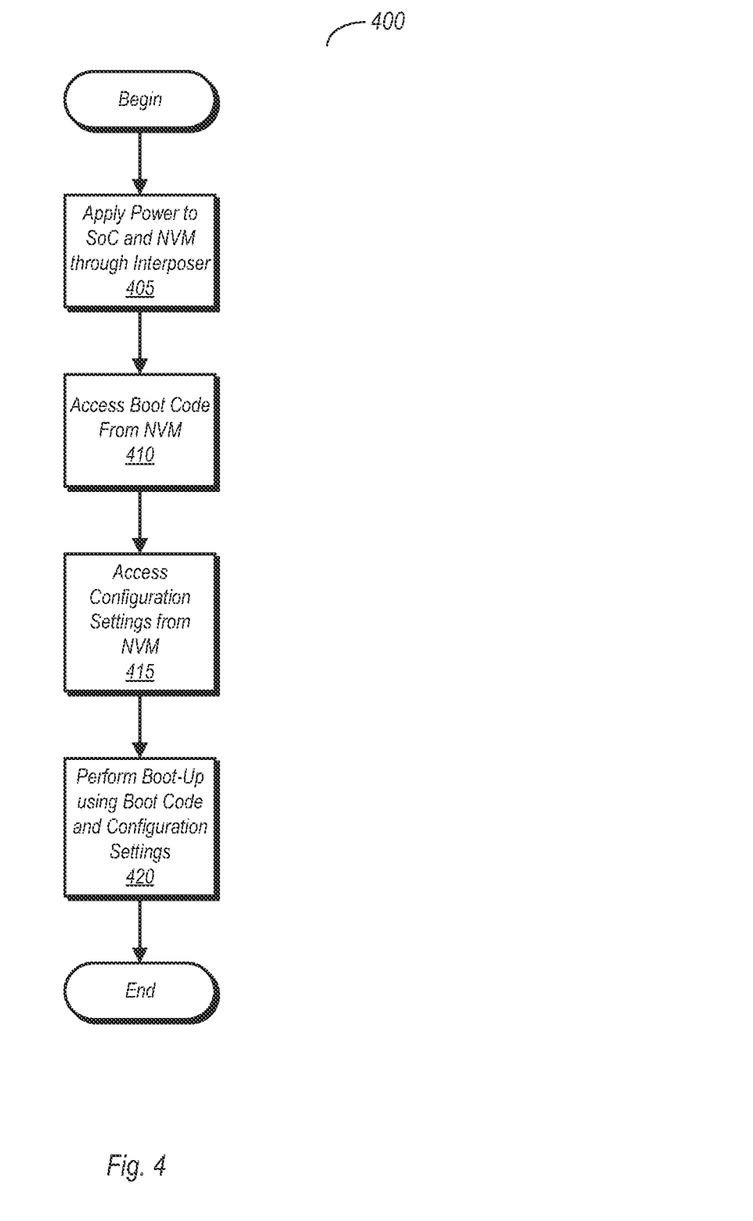
FIG. 4 is a flow diagram illustrating a method for booting a computer system using a non-volatile memory separate from the IC, in accordance with some embodiments.

FIG. 4 is a flow diagram illustrating a method 400 for booting a computer system using a non-volatile memory separate from the processor, in accordance with some embodiments. Method 400 may be performed using various embodiments of the hardware discussed above. Furthermore, method 400 may also be performed by some embodiments not explicitly disclosed herein.

Method 400 begins with the application of power to an IC (e.g., IC 10) and an NVM (e.g., NVM 11) through an interposer (e.g., interposer 20) (block 405). The IC and the NVM may both be mounted on the interposer and electrically connected to one another by signal lines implemented on the same. Responsive to the initial application of power, the IC may begin a boot procedure. The boot procedure may be performed by executing instructions from boot code, which may be stored on the NVM. Accordingly, the IC accesses the boot code from the NVM (block 410). The boot procedure may also include loading configuration settings, which may also be accessed from the NVM by the IC (block 415). The boot up may then be performed by executing the boot code accessed from the NVM, and by setting the IC in a configuration defined by the configuration settings accessed by from the NVM (block 420).

Figure 5:
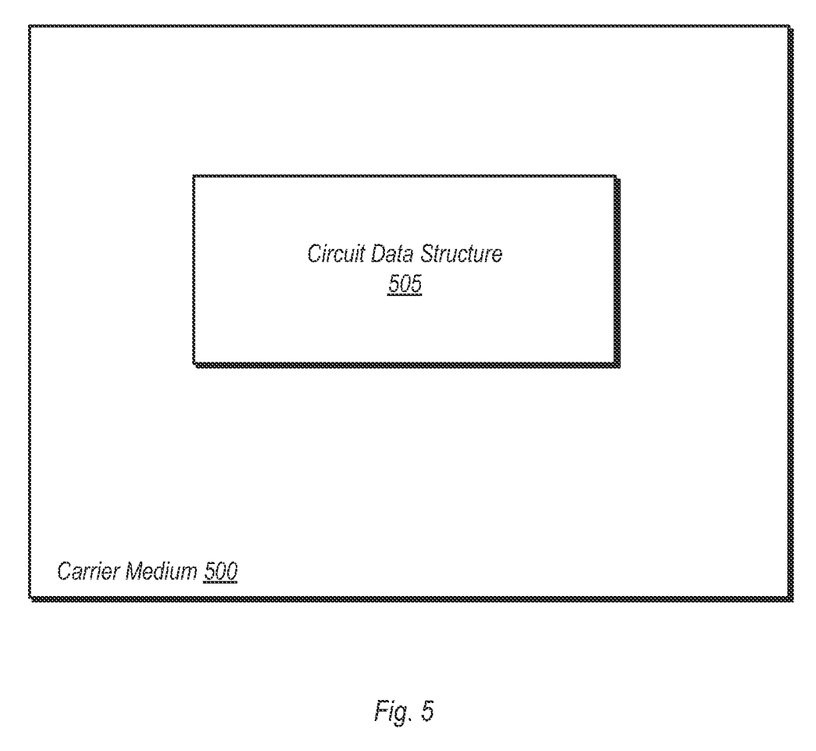
FIG. 5 is a block diagram of a computer readable storage medium, in accordance with some embodiments.

Turning next to FIG. 5, a block diagram of a computer readable storage medium 500 including a database 505 representative of the computer system 5 (or portions thereof) is shown. Generally speaking, a computer readable storage medium 500 may include any non-transitory storage media accessible by a computer during use to provide instructions and/or data to the computer. For example, a computer readable storage medium 500 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the data structure 505 representative of the computer system 5 and/or portions thereof carried on the computer readable storage medium 500 may be a database or other data structure which can be read by a program and used, directly or indirectly, to fabricate the hardware comprising the computer system 5. For example, the data structure 505 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computer system 5. The netlist may then be placed and routed to produce a data set describing geometric shapes to be applied to masks. The masks may then be used in various semiconductor fabrication steps to produce a semiconductor circuit or circuits corresponding to the computer system 5. Alternatively, the database 505 on the computer readable storage medium 500 may be the netlist (with or without the synthesis library) or the data set, as desired, or Graphic Data System (GDS) II data.

While the computer readable storage medium 500 carries a representation of the computer system 5, other embodiments may carry a representation of any portion of the computer system 5, as desired, including IC 10, interposer 20, NVM 11, any set of agents (e.g., processing cores, I/O interface, etc.) or portions of agents. Furthermore, some embodiments of computer readable storage medium 500 may also include data structures storing boot code, configuration settings, or other information that may be stored on NVM 11 as discussed above.

While the embodiments have been described with reference to particular embodiments, it will be understood that the embodiments are illustrative and that the scope is not so limited. Any variations, modifications, additions, and improvements to the embodiments described are possible. These variations, modifications, additions, and improvements may fall within the scope of the embodiments as detailed within the following claims.

What is claimed is:

1. An apparatus comprising:
   a integrated circuit (IC);
   a non-volatile memory configured to store configuration settings and boot code for the IC; and
   an interposer, wherein the IC and the non-volatile memory are both mounted to a substrate of the interposer and electrically coupled to one another through the substrate, wherein the interposer includes a grid array connector suitable for mounting on a printed circuit board (PCB).

2. The apparatus as recited in claim 1, wherein the IC is mounted to the interposer by a ball grid array (BGA) and wherein the non-volatile memory is mounted to the interposer by a second BGA.

3. The apparatus as recited in claim 2, wherein electrical connections coupling the IC to the non-volatile memory are externally inaccessible when the IC and the non-volatile memory are mounted on the interposer.

4. The apparatus as recited in claim 1, wherein the non-volatile memory is a flash memory.

5. The apparatus as recited in claim 1, wherein the IC is a system-on-a-chip (SoC).

6. The apparatus as recited in claim 1, wherein the IC and the non-volatile memory are coupled to receive a supply voltage, and wherein the non-volatile memory is further coupled to receive a programming voltage.

7. The apparatus as recited in claim 1, wherein the non-volatile memory is divided into a plurality of partitions, and wherein the non-volatile memory is configured to, subsequent to programming, lock one of the partitions such that the locked partition is not further re-programmable.

8. The apparatus as recited in claim 1, wherein, responsive to initialization of the IC, the IC is configured to access the configuration information and the boot code from the non-volatile memory.

9. The apparatus as recited in claim 8, wherein the IC includes a static random access memory (SRAM), wherein the IC is configured to load the boot code from the non-volatile memory into the SRAM responsive to initialization of the IC.

10. The apparatus as recited in claim 8, wherein the IC includes a prelude boot code unit, wherein the prelude boot code includes hardwired instructions that, when executed by the IC responsive to initialization, cause the IC to access the boot code stored on the non-volatile memory.

11. The apparatus as recited in claim 1, wherein the non-volatile memory includes a plurality of partitions including:
    a boot code partition storing boot code;
    a permanent partition storing permanent data including a serial number of the IC;
    a debug partition arranged to store debug and trace information; and
    a performance partition storing information related to one or more operating points of the IC.

12. A method comprising:
    providing power to an integrated circuit package including an interposer, an integrated circuit (IC) mounted on the interposer, and a non-volatile memory mounted on the interposer and electrically coupled to the IC, the interposer including a plurality of connection pins arranged in a grid array such that the interposer is suitable for mounting on a printed circuit board (PCB);
    initializing operation of the IC responsive to providing power; and
    performing a boot-up procedure, wherein performing the boot-up procedure comprises the IC accessing boot code from the non-volatile memory.

13. The method as recited in claim 11, further comprising the IC accessing configuration information from the IC during the boot-up procedure.

14. The method as recited in claim 11, wherein the IC and the non-volatile memory are mounted to the interposer by first and second ball grid arrays (BGAs), respectively, and wherein electrical connections between the IC and the non-volatile memory are externally inaccessible.

15. The method as recited in claim 11, wherein the IC includes a static random access memory (SRAM), and wherein the method further comprises the IC loading the boot code into the SRAM during the boot-up procedure.

16. A system comprising:
    an integrated circuit package including a processor, a non-volatile memory, and an interposer, wherein the processor and the non-volatile memory are mounted upon the interposer and electrically coupled to one another, and wherein the interposer includes a plurality of connection pins arranged in a grid array such that the interposer is suitable for mounting on a printed circuit board;
    wherein the non-volatile memory is configured to store boot code and configuration settings for the processor; and
    wherein the processor is configured to, responsive to initially receiving power, perform a boot-up procedure, wherein performing the boot-up procedure comprises accessing the boot code and configuration settings from the non-volatile memory.

17. The system as recited in claim 16, wherein the non-volatile memory is a flash memory.

18. The system as recited in claim 16, wherein the processor is mounted to the interposer by a first ball grid array (BGA) and wherein the non-volatile memory is mounted to the interposer by a second BGA.

19. The system as recited in claim 16, wherein electrical connections between the processor and the non-volatile memory are externally inaccessible when the processor and the non-volatile memory are mounted on the interposer.

20. The system as recited in claim 16, wherein the interposer is coupled to provide a supply voltage to the processor and the non-volatile memory, and wherein the interposer is further coupled to provide a programming voltage to the non-volatile memory.

21. The system as recited in claim 16, wherein the non-volatile memory includes a plurality of partitions including:

a boot code partition storing boot code;
a permanent partition storing permanent data including a serial number of the integrated circuit package;
a debug partition arranged to store debug and trace information; and
a performance partition storing information related to one or more operating points of the processor.

\* \* \* \* \*